(12) United States Patent
Takahashi

(10) Patent No.: US 10,063,779 B2
(45) Date of Patent: Aug. 28, 2018

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 15/427,383

(22) Filed: Feb. 8, 2017

(65) Prior Publication Data
US 2017/0237904 A1 Aug. 17, 2017

(30) Foreign Application Priority Data
Feb. 12, 2016 (JP) .................................. 2016-025203

(51) Int. Cl.
| | |
|---|---|
| *H04N 5/228* | (2006.01) |
| *H04N 5/232* | (2006.01) |
| *G06T 5/00* | (2006.01) |
| *G06T 5/50* | (2006.01) |

(52) U.S. Cl.
CPC ......... *H04N 5/23267* (2013.01); *G06T 5/003* (2013.01); *G06T 5/50* (2013.01); *H04N 5/23254* (2013.01); *H04N 5/23261* (2013.01); *G06T 2207/10016* (2013.01); *G06T 2207/10024* (2013.01); *G06T 2207/20182* (2013.01); *G06T 2207/20201* (2013.01); *G06T 2207/20221* (2013.01)

(58) Field of Classification Search
CPC . G06T 2207/10016; G06T 2207/10024; G06T 2207/20182; G06T 2207/20201; G06T 2207/20221; G06T 5/003; G06T 5/50; H04N 5/23254; H04N 5/23261; H04N 5/23267; H04N 19/159; H04N 19/172; H04N 19/82; H04N 19/51; H04N 5/272
See application file for complete search history.

(56) References Cited

U.S. PATENT DOCUMENTS

| | | | | |
|---|---|---|---|---|
| 9,674,441 | B2 * | 6/2017 | Tsubaki | ............ H04N 5/23267 |
| 2006/0119617 | A1 * | 6/2006 | Toyooka | .............. G09G 3/2092 |
| | | | | 345/619 |
| 2010/0188535 | A1 * | 7/2010 | Mitsuya | .................... G06T 5/50 |
| | | | | 348/241 |
| 2012/0269444 | A1 * | 10/2012 | Naito | ................. H04N 5/23229 |
| | | | | 382/197 |

(Continued)

FOREIGN PATENT DOCUMENTS

JP        2006-080844 A     3/2006

*Primary Examiner* — Chia-Wei A Chen
(74) *Attorney, Agent, or Firm* — Cowan, Liebowitz & Latman, P.C.

(57) ABSTRACT

An image processing apparatus comprises the following units. A dividing unit divides a frame of a moving image into a changing area in which there is an active object and a changeless area in which there is a stationary object. A generation unit generates a still image by compositing an area corresponding to the changeless area in each of X frame(s) (where X is an integer of 1 or more) among a plurality of frames included in the moving image and an area corresponding to the changing area in each of Y frames (where Y is an integer greater than X) among the plurality of frames.

16 Claims, 16 Drawing Sheets

(56) References Cited

U.S. PATENT DOCUMENTS

| | | | |
|---|---|---|---|
| 2013/0201366 A1* | 8/2013 | Ozaki | H04N 5/272 |
| | | | 348/231.99 |
| 2016/0044245 A1* | 2/2016 | Tsubaki | H04N 5/23287 |
| | | | 348/208.11 |
| 2017/0155845 A1* | 6/2017 | Manabe | H04N 5/23254 |
| 2017/0228876 A1* | 8/2017 | Ebiyama | G06T 7/246 |

* cited by examiner

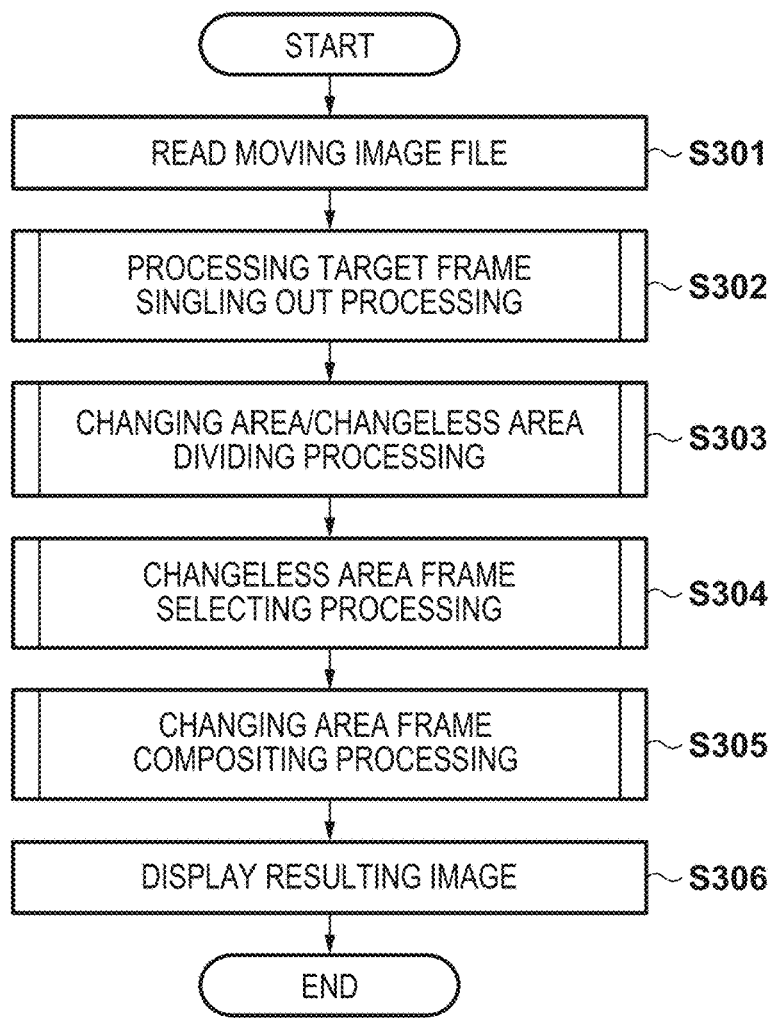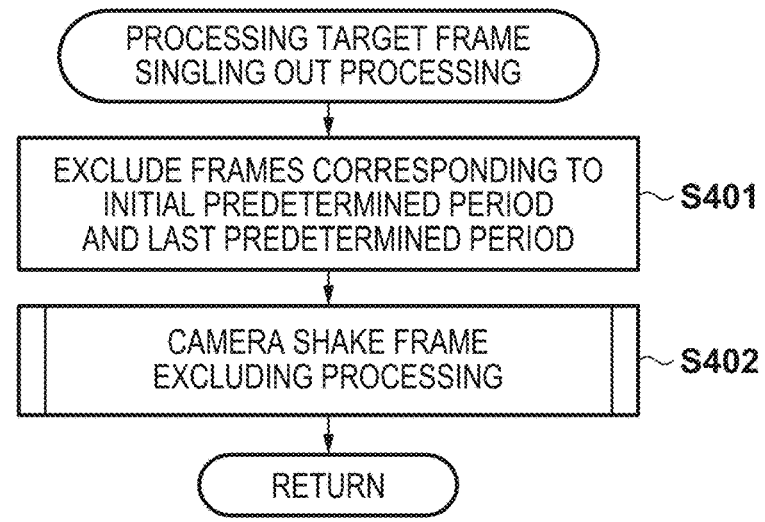

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

Slow shutter technique is one of techniques for capturing an image with a camera. This image capturing technique is also known as a bulb capture or a slow shutter speed exposure. With the image capturing technique, exposure is performed for a longer time (for example, 10 seconds) than normal capture, thereby giving a compositing effect to an active object in the time axis direction, and realizing a video depiction that is different from that obtained by normal capture.

In addition, in order to obtain a sufficient panning effect, a technique for increasing the amount of blur in a background area perceived as moving by detecting motion vectors when capturing while panning is also known (see Japanese Patent Laid-Open No. 2006-80844).

In the case where slow shutter capture is performed while the camera is held with a hand, changes are likely to occur in the camera attitude due to camera shake during exposure, and it is highly likely to result in an image in which not only an active object but also a stationary object and the background are blurred. For this reason, in general, slow shutter capture is performed with the camera attitude being fixed by using a tripod. However, carrying a tripod to a capturing location and setting up the tripod imposes a great burden on the user.

Also, with the technique disclosed in Japanese Patent Laid-Open No. 2006-80844, an effect similar to the slow shutter effect can be obtained irrespective of exposure conditions, but this effect does not cope with the actual movement of an object, and thus cannot replace slow shutter capture.

SUMMARY OF THE INVENTION

The present invention has been made under the circumstances described above, and the present invention provides a technique with which an image having a slow shutter effect can be generated while reducing image blurring in a changeless area even when image capturing is performed under conditions prone to camera shake.

According to a first aspect of the present invention, there is provided an image processing apparatus comprising: a dividing unit configured to divide a frame of a moving image into a changing area in which there is an active object and a changeless area in which there is a stationary object; and a generation unit configured to generate a still image by compositing an area corresponding to the changeless area in each of X frame(s) (where X is an integer of 1 or more) among a plurality of frames included in the moving image and an area corresponding to the changing area in each of Y frames (where Y is an integer greater than X) among the plurality of frames.

According to a second aspect of the present invention, there is provided an image capturing apparatus comprising: a dividing unit configured to divide a frame of a moving image into a changing area in which there is an active object and a changeless area in which there is a stationary object; a generation unit configured to generate a still image by compositing an area corresponding to the changeless area in each of X frame(s) (where X is an integer of 1 or more) among a plurality of frames included in the moving image and an area corresponding to the changing area in each of Y frames (where Y is an integer greater than X) among the plurality of frames; and an image capturing unit configured to capture the moving image.

According to a third aspect of the present invention, there is provided an image processing method executed by an image processing apparatus, comprising: dividing a frame of a moving image into a changing area in which there is an active object and a changeless area in which there is a stationary object; and generating a still image by compositing an area corresponding to the changeless area in each of X frame(s) (where X is an integer of 1 or more) among a plurality of frames included in the moving image and an area corresponding to the changing area in each of Y frames (where Y is an integer greater than X) among the plurality of frames.

According to a fourth aspect of the present invention, there is provided a non-transitory computer-readable storage medium which stores a program for causing a computer to execute an image processing method comprising: dividing a frame of a moving image into a changing area in which there is an active object and a changeless area in which there is a stationary object; and generating a still image by compositing an area corresponding to the changeless area in each of X frame(s) (where X is an integer of 1 or more) among a plurality of frames included in the moving image and an area corresponding to the changing area in each of Y frames (where Y is an integer greater than X) among the plurality of frames.

Further features of the present invention will become apparent from the following description of exemplary embodiments with reference to the attached drawings.

BRIEF DESCRIPTION OF THE DRAWINGS

FIG. 3 is a flowchart illustrating slow shutter effect processing.

FIG. 4 is a flowchart illustrating details of processing target frame singling out processing (step S302).

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
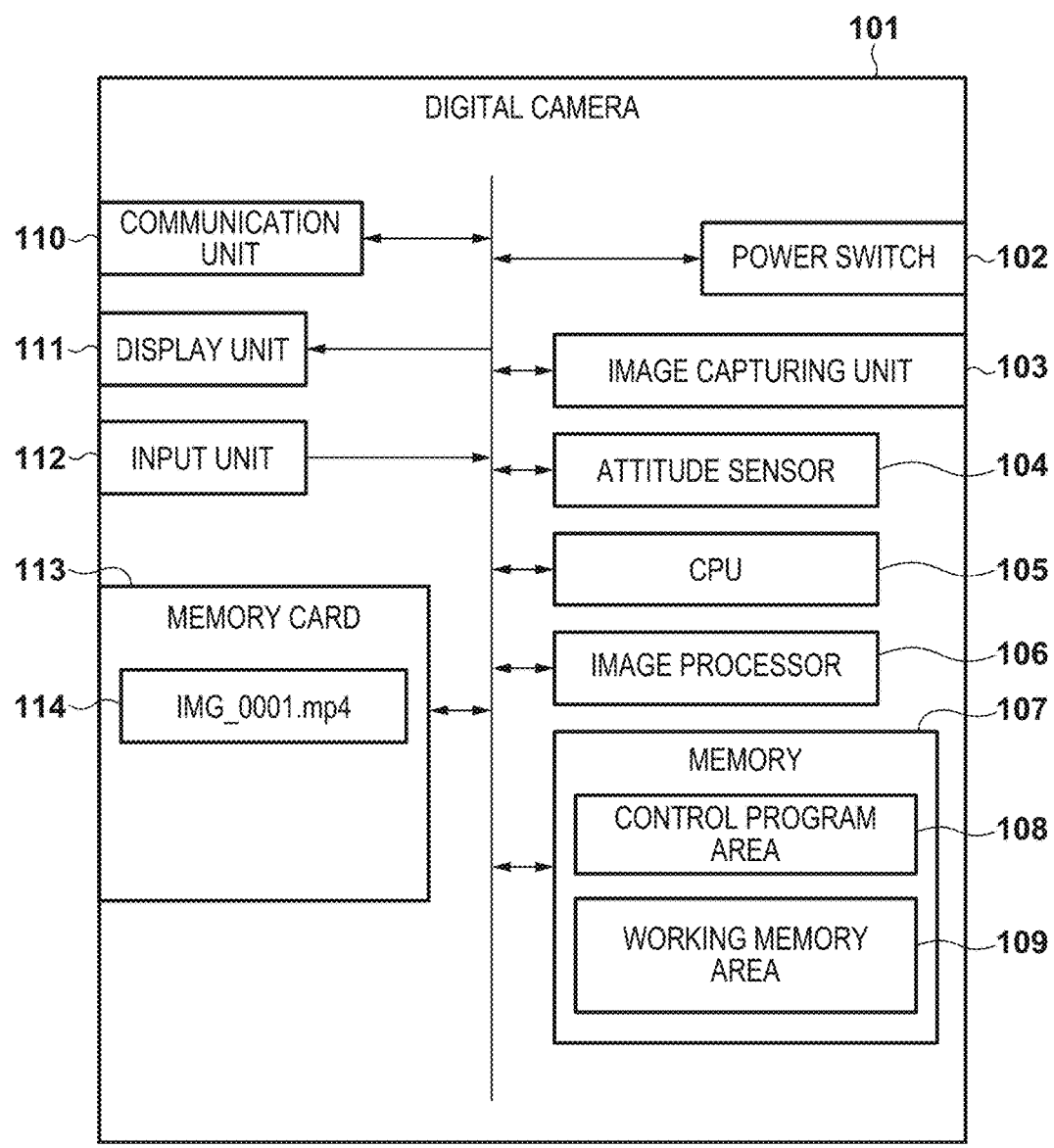
FIG. 1 is a block diagram showing a configuration of a digital camera 101, which is an example of an image capturing apparatus.

FIG. 1 is a block diagram showing a configuration of a digital camera 101, which is an example of an image capturing apparatus. The digital camera 101 includes a power switch 102, an image capturing unit 103, an attitude sensor 104, a CPU 105, an image processor 106 and a memory 107. The memory 107 includes a control program area 108 and a working memory area 109. The digital camera 101 also includes a communication unit 110, a display unit 111, an input unit 112 and a memory card 113. The memory card 113 can store therein a moving image file 114. The digital camera 101 also includes other constituent elements (not shown) that are usually included in a digital camera.

When the user powers on the digital camera through operation of the power switch 102, the CPU 105 executes a program stored in the control program area 108 and thereby controls various types of functions of the digital camera 101. The digital camera 101 thereby performs operation as a digital camera.

When the user inputs an image capture instruction via the input unit 112, under control of the CPU 105, the image capturing unit 103 performs image capturing, and the image processor 106 performs development processing, compression encoding, and the like. The CPU 105 records a moving image obtained as described above in the memory card 113 as a moving image file 114. At this time, the attitude sensor 104 acquires attitude information (camera attitude information) of the digital camera 101 during image capturing. The CPU 105 records the camera attitude information in the moving image file 114 as metadata. The moving image file 114 is thereby associated with the camera attitude information.

The display unit 111 functions as a user interface for the user to check a captured image or for the user to input an instruction via the input unit 112. The communication unit 110 transmits captured image data to an external device such as a smartphone through wireless communication such as Wi-Fi.

Figure 2:
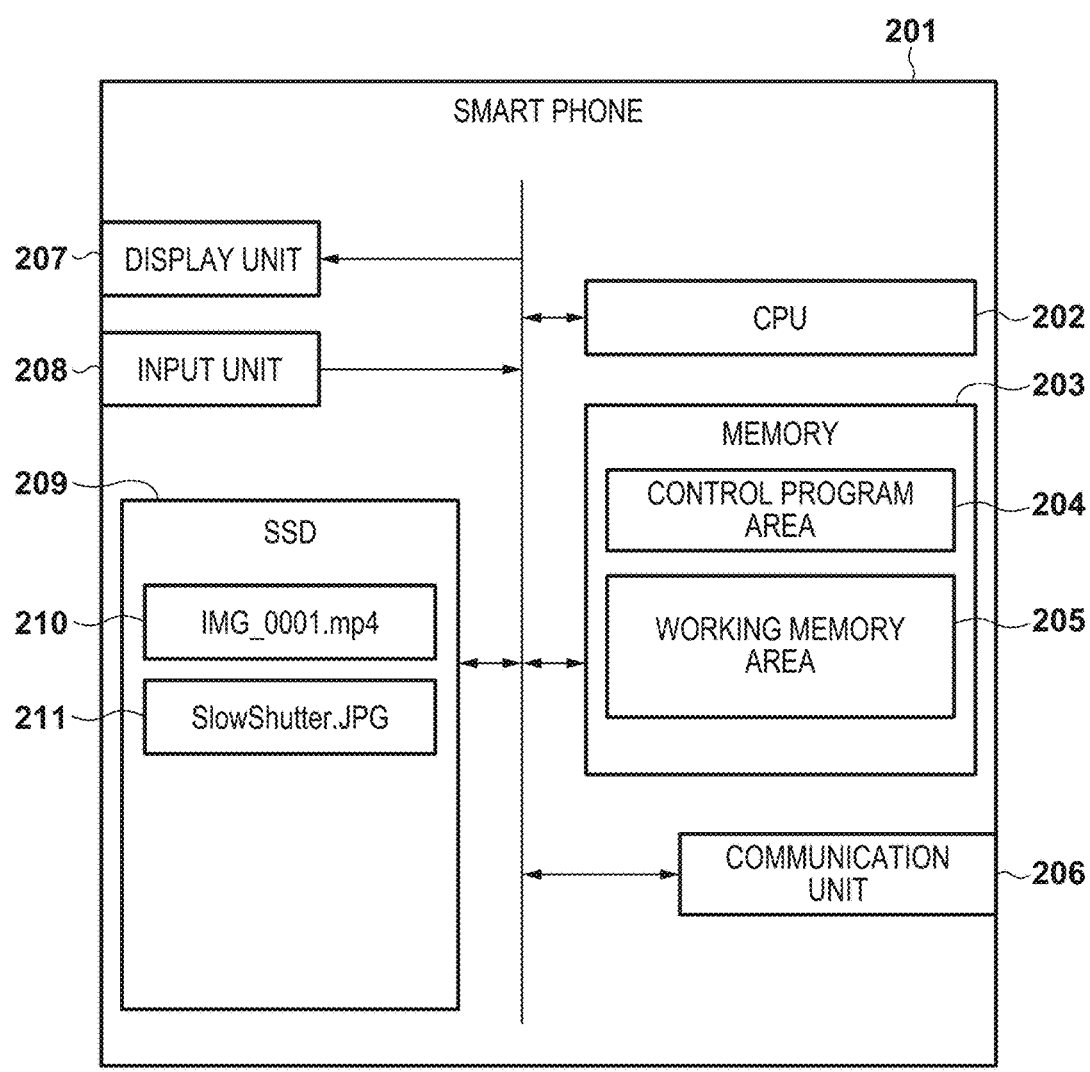
FIG. 2 is a block diagram showing a configuration of a smartphone 201, which is an example of an image processing apparatus.

FIG. 2 is a block diagram showing a configuration of a smartphone 201, which is an example of an image processing apparatus. The smartphone 201 has a function of generating a still image (slow shutter image) having a slow shutter effect from captured moving image data. In the present embodiment, two separate apparatuses are provided: an apparatus for generating moving image data; and an apparatus for generating a slow shutter image, but a configuration is also possible in which one apparatus executes both generation of moving image data and generation of a slow shutter image. For example, the digital camera 101 may have a function of generating a slow shutter image. Instead of the smartphone 201, a personal computer may have a function of generating a slow shutter image.

The smartphone 201 includes a CPU 202 and a memory 203. The memory 203 includes a control program area 204 and a working memory area 205. The smartphone 201 also includes a communication unit 206, a display unit 207, an input unit 208 and a SSD (Solid State Drive) 209. The SSD 209 can store therein a moving image file 210 and a slow shutter image 211 (still image file). The smartphone 201 also includes other constituent elements (not shown) that are usually included in a smartphone.

When the user designates the moving image file 210 via the input unit 208 and issues an instruction to execute slow shutter effect processing, the CPU 202 executes a program stored in the control program area 204 and thereby executes the slow shutter effect processing. The CPU 202 stores still image data generated through the slow shutter effect processing as the slow shutter image 211. Note that the user can adjust the effect while checking the slow shutter effect during execution of the slow shutter effect processing. In this case, the still image data is temporarily stored in the working memory area 205 and displayed on the display unit 207.

FIG. 3 is a flowchart illustrating the slow shutter effect processing. Unless otherwise stated, the processing of each step included in this flowchart is implemented by the CPU 202 of the smartphone 201 executing a program stored in the control program area 204.

In step S301, the CPU 202 reads the moving image file 210 into the working memory area 205. It is assumed here that the smartphone 201 has, in advance, acquired the moving image file 114 from the digital camera 101 and stored the acquired file in the SSD 209 as the moving image file 210.

In step S302, the CPU 202 singles out frames suitable for the slow shutter effect processing (processing target frames) from among all frames included in the moving image file 210. The processing target frame singling out processing will be described later in detail.

In step S303, the CPU 202 performs changing area/changeless area dividing processing. The changing area/changeless area dividing processing refers to processing in which a frame of moving image is divided into a changing area (the area in which there is an active object) and a changeless area (the area in which there is a stationary object). Here, a frame of the moving image may be an area corresponding to the captured angle of view, or may be a partial area cut out from the area corresponding to the captured angle of view. The changing area/changeless area dividing processing will be described later in detail. In step S304, the CPU 202 performs changeless area frame selecting processing for selecting a frame that can be used for the changeless area in the resulting image (the slow shutter image finally generated by the slow shutter effect processing). The changeless area frame selecting processing will be described later in detail.

In step S305, the CPU 202 performs changing area frame compositing processing. The changing area frame compositing processing will be described later in detail. In step S306, the CPU 202 causes the display unit 207 to display the resulting image. After that, the CPU 202 ends the processing shown in the flowchart.

Figure 5:
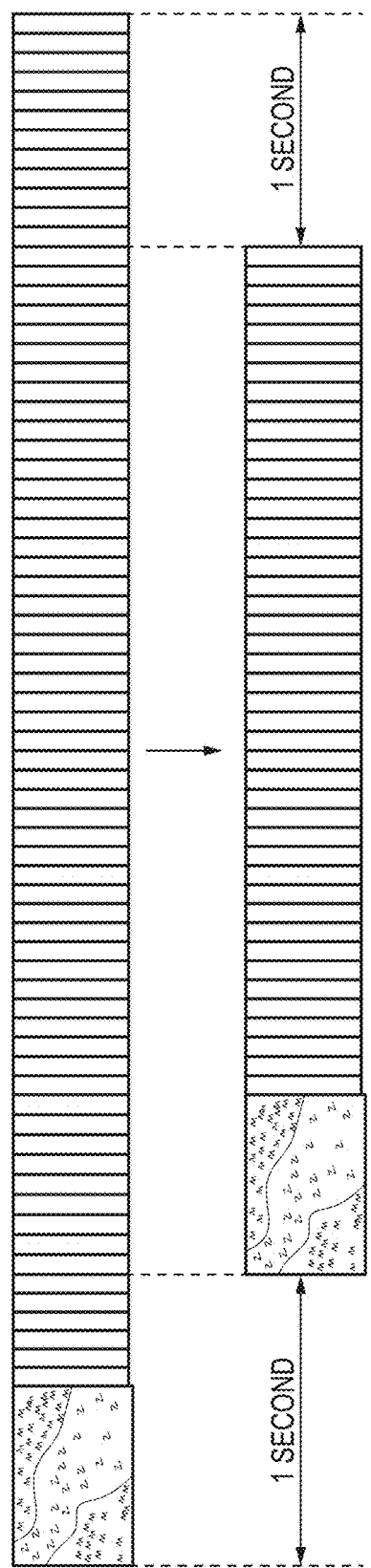
FIG. 5 is a diagram showing an example of processing in step S401.

FIG. 4 is a flowchart illustrating details of the processing target frame singling out processing (step S302). In step S401, the CPU 202 excludes frames corresponding to an initial predetermined period (for example, several seconds) and a last predetermined period (for example, several seconds) of a capturing period among all of the frames in the moving image data, from processing target frames. FIG. 5 is a diagram showing an example of the processing in step S401. It is assumed here that frames corresponding to the initial 1 second and the last 1 second are excluded from processing target frames. In general, significant changes occur in the camera attitude at the start and end of moving image capture due to operation of buttons and the like to provide a start instruction and an end instruction. For this reason, it is highly likely that blurring occurs in the frames corresponding to such periods, resulting in an inappropriate slow shutter image. Accordingly, such frames are excluded from processing target frames.

In the present embodiment, the frames corresponding to the initial predetermined period and the last predetermined period are excluded, but the present embodiment is not limited thereto. For example, either the frames corresponding to the initial predetermined period or the frames corresponding to the last predetermined period may be excluded. Also, in the case of the operating members being devised such that camera shake is unlikely to occur, the length of the periods may be shortened. Alternatively, a configuration is possible in which a user interface is provided that allows the user to select an exclusion period (the length of the predetermined periods) and the exclusion period is decided in accordance with a user instruction.

Figure 6:
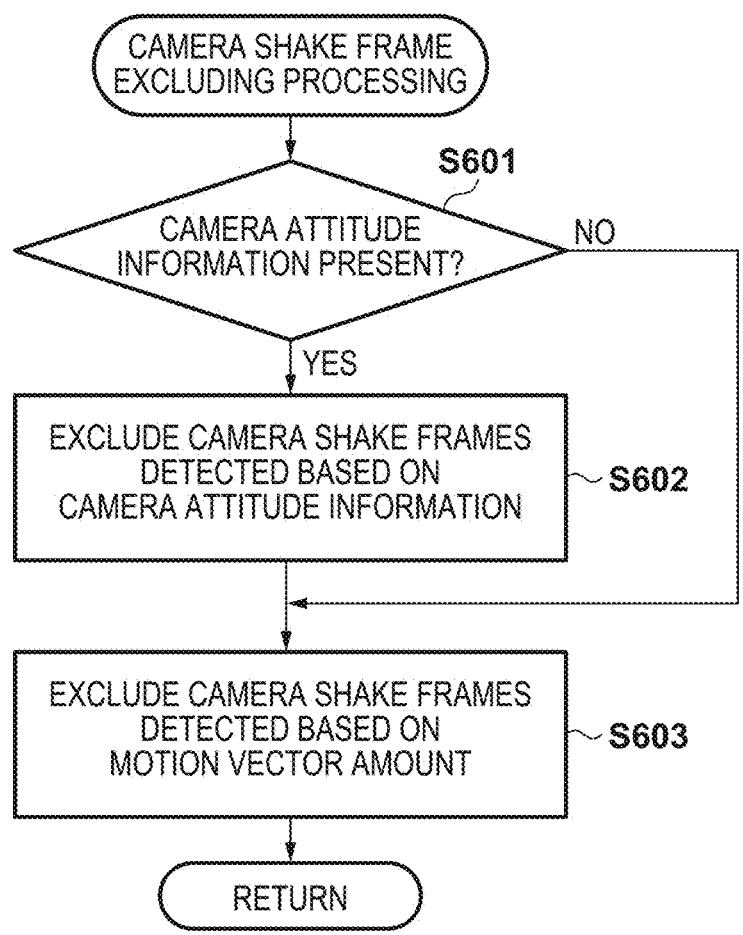
FIG. 6 is a flowchart illustrating details of camera shake frame excluding processing (step S402).

In step S402, the CPU 202 performs camera shake frame excluding processing. FIG. 6 is a flowchart illustrating details of the camera shake frame excluding processing (step S402).

In step S601, the CPU 202 determines whether or not there is camera attitude information as metadata of the moving image file 210. If it is determined that there is camera attitude information, the CPU 202 advances the processing to step S602. If it is determined that there is no camera attitude information, the CPU 202 advances the processing to step S603.

Figure 7:
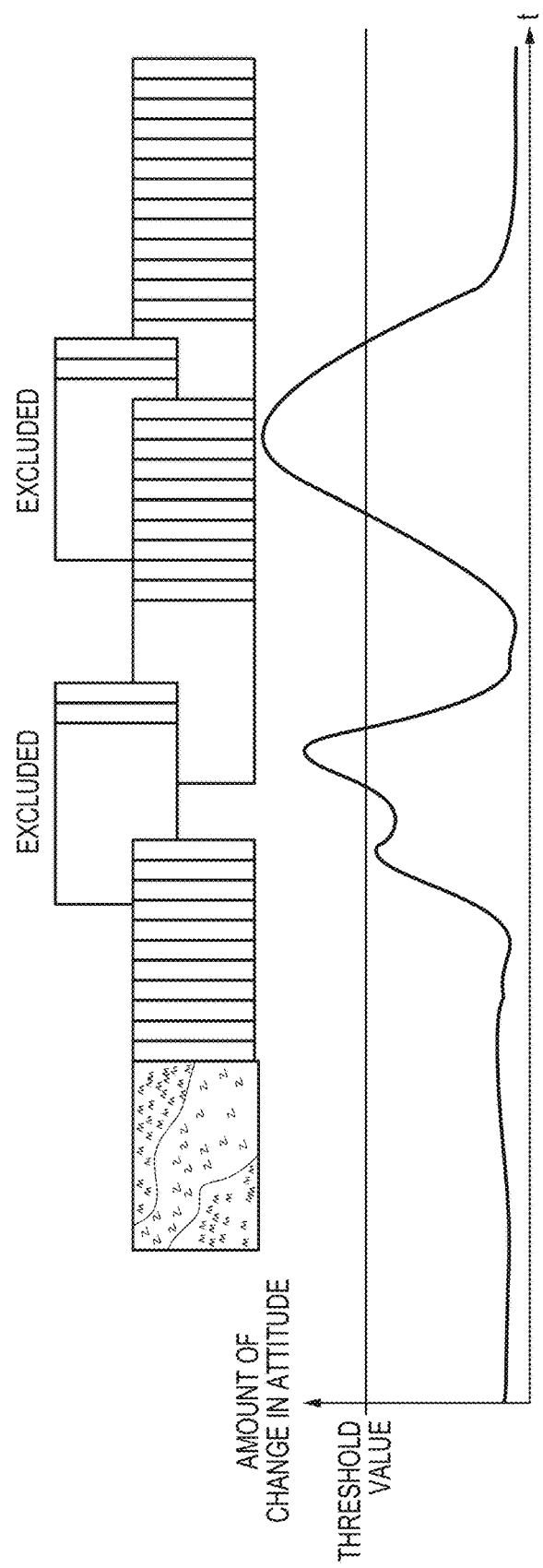
FIG. 7 is a diagram showing an example in which camera shake frames are detected and excluded based on camera attitude information.

In step S602, the CPU 202 detects, while referencing to the camera attitude information, frames in which a significant change occurred in the camera attitude at the time of capturing the frames (frames captured at a timing at which the amount of change in the attitude is greater than or equal to a third threshold value) as camera shake frames. Then, the CPU 202 excludes the detected camera shake frames from processing target frames. FIG. 7 is a diagram showing an example in which camera shake frames are detected and excluded based on the camera attitude information. As shown in FIG. 7, frames within period in which a significant change occurred in the camera attitude are detected and excluded from processing target frames.

In step S603, the CPU 202 detects a motion vector amount between frames in the moving image by image analysis, and detects camera shake frames based on the motion vector amount. The CPU 202 excludes camera shake frames detected in the manner described above from processing target frames.

As the motion vector detection method according to the present embodiment, a gradient method is used, but the motion vector detection method is not limited thereto. As an example, in the present embodiment, the CPU 202 classifies each frame into a group based on the direction and amount of a plurality of motion vectors within the frame. Then, the CPU 202 determines a group including the largest number of motion vectors as a camera shake motion vector group including motion vectors caused by camera shake. Then, if the length of vectors in the determined group is greater than or equal to a threshold value, the CPU 202 detects the corresponding frame as a camera shake frame.

Through the processing described above, some of all of the frames in the moving image are singled out as processing target frames. That is, the frames that were not excluded by the above processing are finally singled out as processing target frames.

Figure 8:
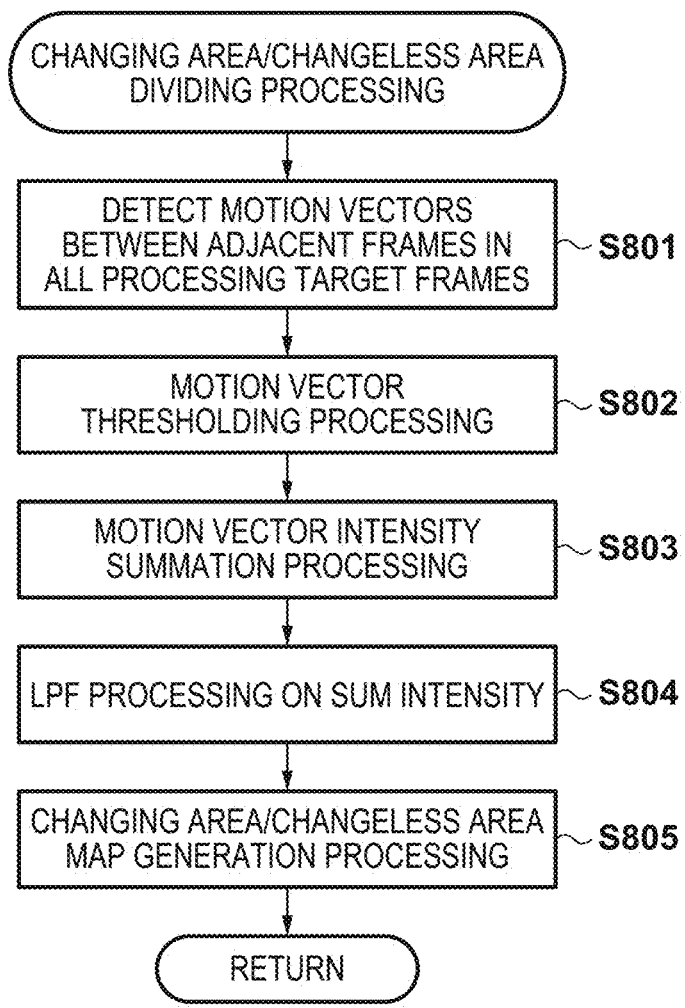
FIG. 8 is a flowchart illustrating details of changing area/changeless area dividing processing (step S303).

The changing area/changeless area dividing processing (step S303) will be described next in detail with reference to FIG. 8. In step S801, the CPU 202 detects motion vectors between adjacent frames in all of the processing target frames. The motion vector detection processing performed here is the same as the processing in step S603. For this reason, the CPU 202 may store the result of processing in step S603 in the working memory area 205, and in step S801, re-use the result of processing in step S603.

Figure 9:
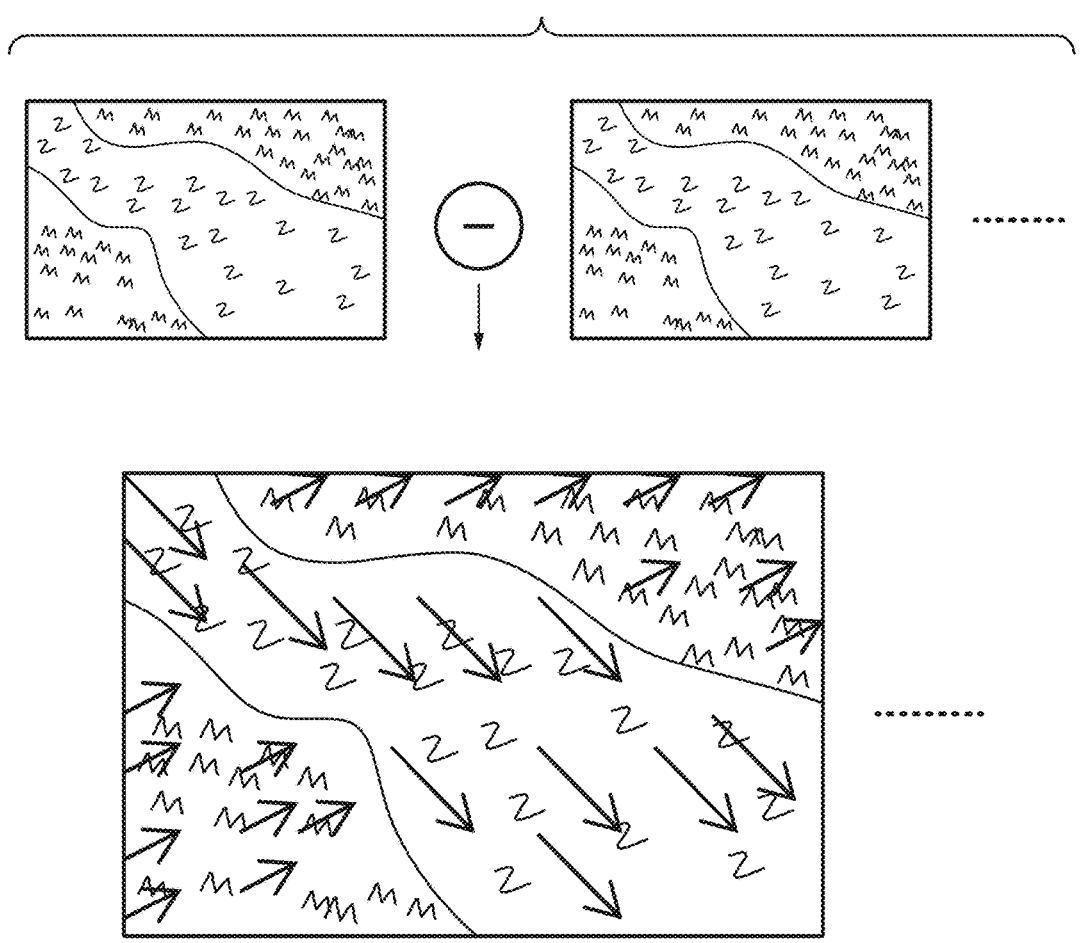
FIG. 9 is a diagram showing an example of processing in step S801.

FIG. 9 is a diagram showing an example of the processing in step S801. In a river portion shown in the diagram, motion vectors in the changing area representing river current are detected as relatively large vectors. In the changeless area other than the changing area, the presence of a large number of vectors of the same magnitude that have a relatively small value and point in the same direction is detected. As can be understood from FIG. 9, the CPU 202 detects motion vectors in each of the plurality of areas in the frame when performing the motion vector detection. There is no particular limitation on the method for deciding a plurality of areas to be detected, but the larger the number of areas (the smaller each area), the more the accuracy of the changing area/changeless area dividing processing is improved.

In step S802, the CPU 202 performs motion vector thresholding processing so as to remove motion vectors (camera shake motion vectors) caused by camera shake with respect to all of the processing target frames.

Figure 10:
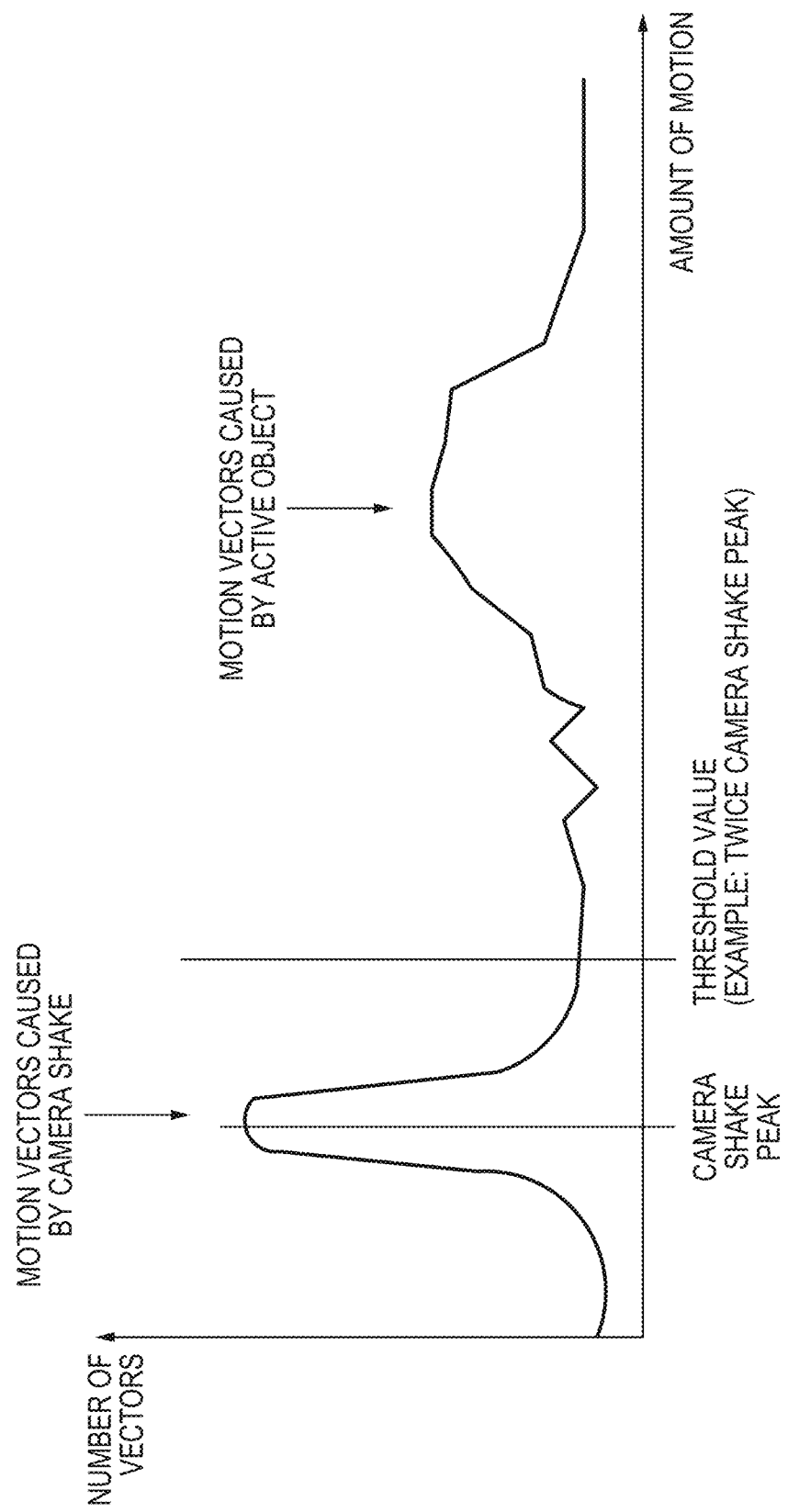
FIG. 10 is a diagram showing an example of motion vector thresholding processing (step S802).

FIG. 10 is a diagram showing an example of the motion vector thresholding processing (step S802). FIG. 10 is a histogram, with the horizontal axis indicating vector magnitude component (the amount of motion) and the vertical axis indicating the number of vectors. The camera shake motion vectors have a feature in that a large number of vectors having a uniform magnitude are generated in a uniform direction. Also, because the frames including motion vectors caused by a large camera shake have been excluded from processing target frames by the processing target frame singling out processing performed in step S302, it is presumed that, among the large number of generated vectors, relatively small (short) vectors are camera shake motion vectors. In FIG. 10, it is possible to determine that, among two peaks in the histogram, the higher peak (the peak having a small amount of motion) represents camera shake motion vectors. By removing vectors whose magnitude component is less than a threshold value (second threshold value) that is a value corresponding to, for example, a position twice this peak, it is possible to detect only motion vectors caused by the active object (object motion vectors). In other words, the CPU 202 decides the threshold value (second threshold value) for identifying the camera shake motion vectors, based on a frequency distribution of the magnitude components of the motion vectors.

The camera shake motion vectors also have a property of pointing in a substantially uniform direction. For this reason, the CPU 202 may group the motion vectors according to the direction (for example, the direction may be divided into eight). In this case, the CPU 202 obtains a histogram for each group, and determines the direction of a group having a highest degree of concentration to a position in which the magnitude components are small (highest degree of concentration of small motion vectors) as a camera shake direction. Then, the CPU 202 identifies camera shake motion vectors from the group of the determined camera shake direction based on the threshold of the magnitude component.

Figure 11:
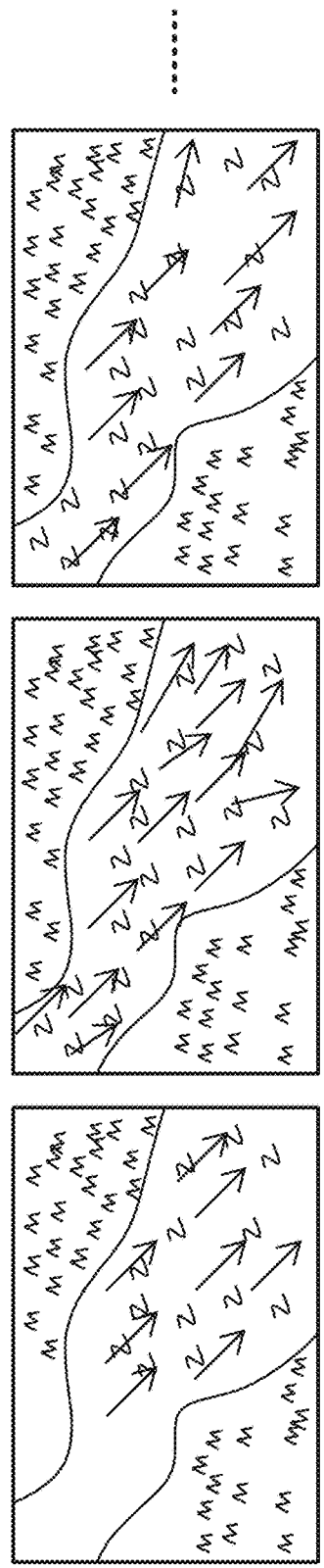
FIG. 11 is a diagram showing an example of results of the motion vector thresholding processing (step S802).

FIG. 11 is a diagram showing an example of results of the motion vector thresholding processing (step S802). As shown in FIG. 11, only motion vectors in the changing area are left without being removed.

Figure 12:
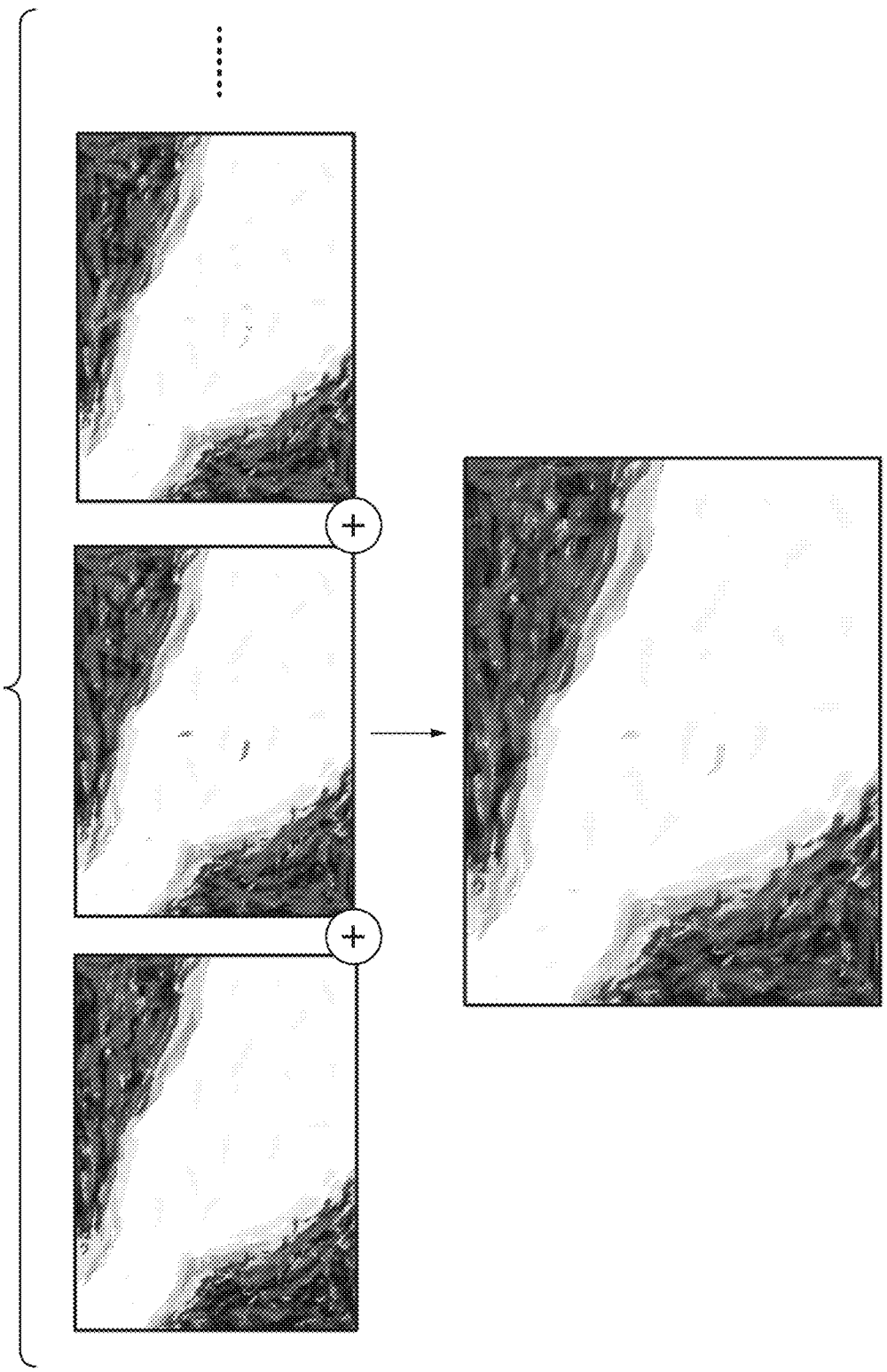
FIG. 12 is a diagram showing an example of motion vector intensity summation processing (step S803).

In step S803, the CPU 202 performs motion vector intensity summation processing. To be specific, the CPU 202 sums, for each area, the motion vector amounts (magnitude components) of all of the processing target frames. This processing is processing for dividing into a changing area and a changeless area, and thus the CPU 202 acquires a sum value of only the amounts (magnitude components) of the vectors without giving consideration to the direction component of the vectors. FIG. 12 is a diagram showing an example of the motion vector intensity summation processing (step S803). In FIG. 12, a position where the motion vector amount is larger is shown in a color closer to white, and a position where the motion vector amount is smaller is shown in a color closer to black.

In step S804, the CPU 202 executes LPF processing (low-pass filter processing) on sum intensity. This processing is effective particularly when, for example, the motion vector resolution is not all pixels. For this reason, the CPU 202 may skip the processing in step S804 according to the accuracy of the motion vector detection processing or the like.

Figure 13:
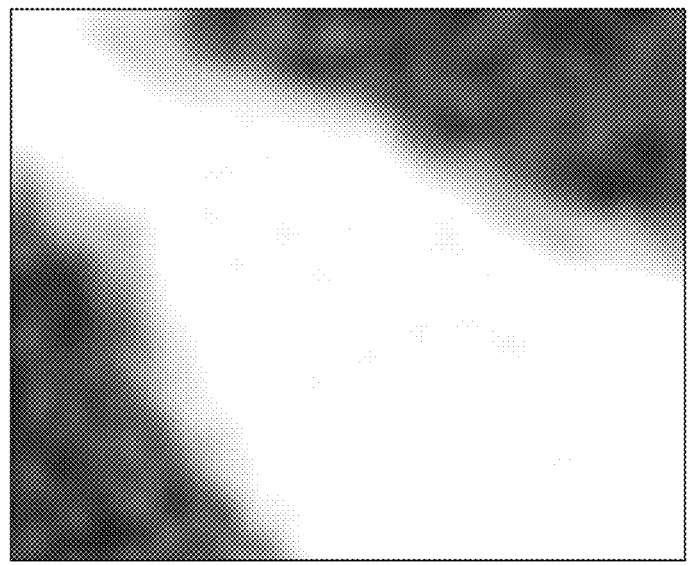
FIG. 13 is a diagram showing an example of a motion vector amount map obtained as a result of LPF processing (step S804).

FIG. 13 is a diagram showing an example of a motion vector amount map obtained as a result of the LPF processing (step S804). In FIG. 13, a position where the motion vector amount is larger is shown in a color closer to white, and a position where the motion vector amount is smaller is shown in a color closer to black.

Figure 14:
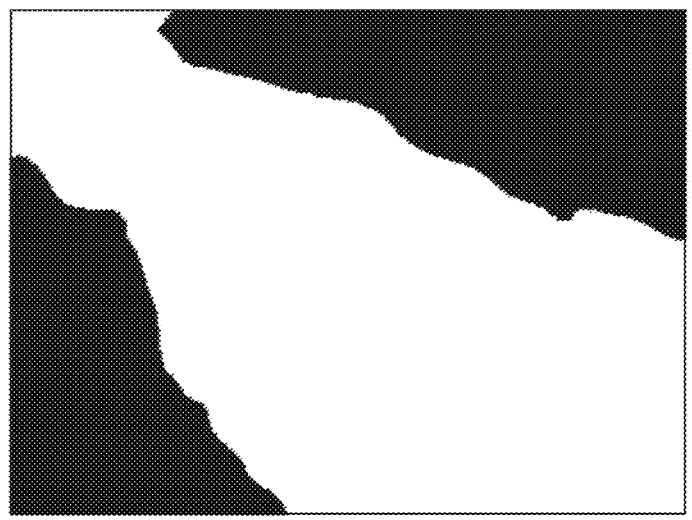
FIG. 14 is a diagram showing an example of a changing area/changeless area map.

In step S805, the CPU 202 performs binarization of the motion vector amount map through thresholding processing, and thereby generates a changing area/changeless area map. The threshold value (first threshold value) used in this processing is a value that is dependent on the number of frames obtained by summing motion vectors. FIG. 14 is a diagram showing an example of the changing area/changeless area map obtained in the manner described above. As shown in FIG. 14, the river portion, which is the changing area, is shown in white, and the other portion, which is the changeless area, is shown in black. That is, the CPU 202 determines an area in which the sum value of the magnitude component is greater than or equal to the threshold value as the changing area, and an area in which the sum value of the magnitude component is less than the threshold value as the changeless area.

Figure 15:
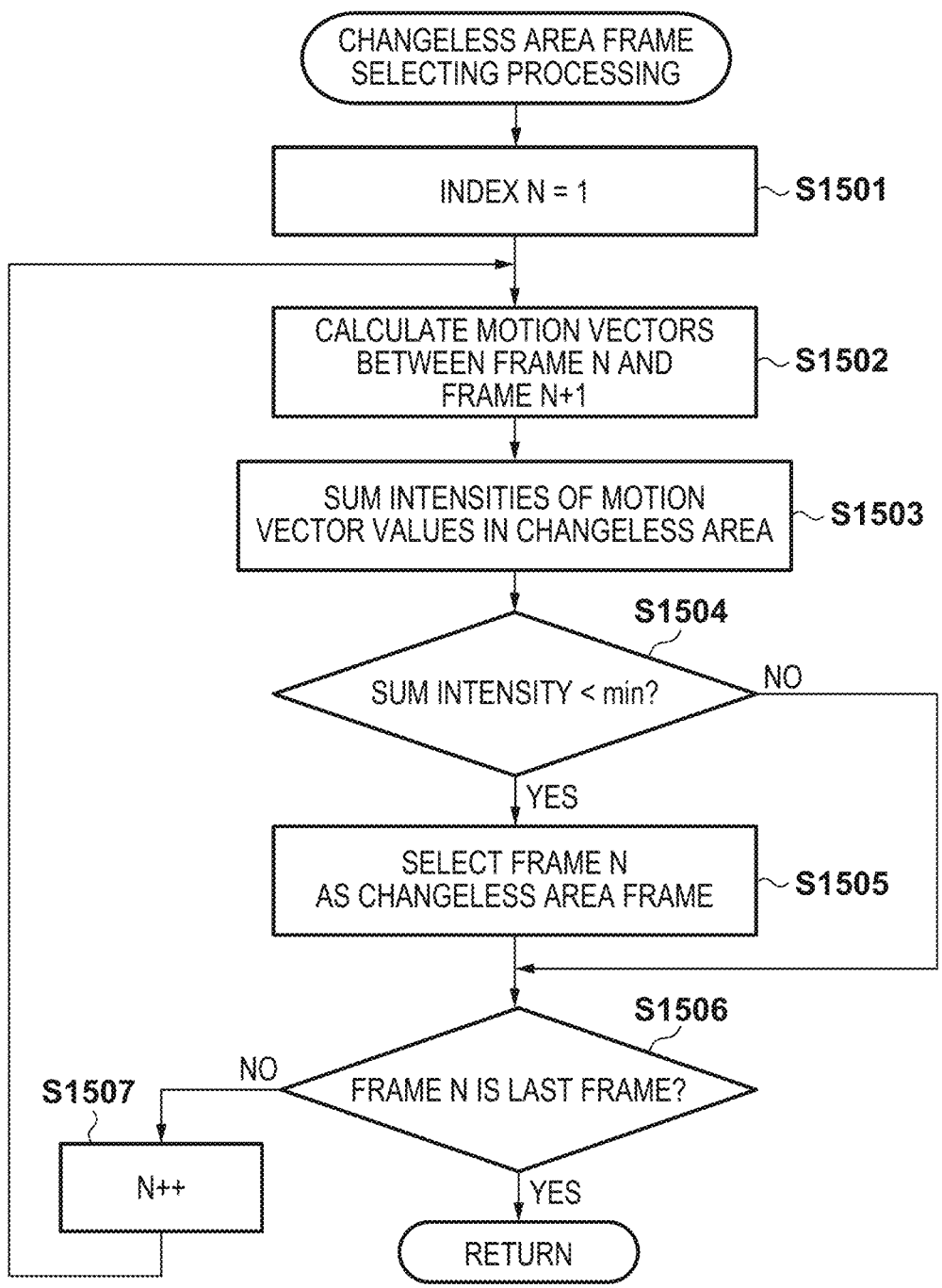
FIG. 15 is a flowchart illustrating details of changeless area frame selecting processing (step S304).

FIG. 15 is a flowchart illustrating details of the changeless area frame selecting processing (step S304). The changeless area frame selecting processing is processing for selecting frames in which the object motion in an area corresponding to the changeless area is smallest as changeless area frames.

In step S1501, the CPU 202 sets processing target frame index N to 1. In step S1502, the CPU 202 calculates motion vectors between frame N and frame N+1.

In step S1503, the CPU 202 references to the changing area/changeless area map (FIG. 14), and sums the motion vector intensity (magnitude component) of each of a plurality of areas in the changeless area. In step S1504, the CPU 202 determines whether or not the sum value of the frame N is the smallest value among the previous frames. If it is determined that the sum value is the smallest value ((the sum value of the frame N)<(the smallest value min among the previous frames)), the CPU 202 advances the processing to step S1505. Otherwise, the CPU 202 advances the processing to step S1506.

In step S1505, the CPU 202 selects the frame N as a changeless area frame. In step S1506, the CPU 202 determines whether or not the frame N is the last frame among the processing target frames. If it is determined that the frame N is not the last frame, the CPU 202 increments N by one in step S1507, and thereafter again advances the processing to step S1502. If it is determined that the frame N is the last frame, the CPU 202 ends the processing shown in the flowchart and returns to the flowchart shown in FIG. 3. In this case, the changeless area frame finally selected in step S1505 is used as a compositing target in the changing area frame compositing processing in step S305.

In FIG. 15, the number of changeless area frames selected is one, but the present embodiment is not limited thereto. To generalize it, the CPU 202 selects X frame(s) (where X is an integer of 1 or more) as a changeless area frame(s). If X is two or more, the CPU 202 extracts corresponding points between frames, performs shift processing, and thereafter additionally selects (X−1) frame in which a difference with respect to one frame selected according to the flowchart shown in FIG. 15 is smallest. In this case, in the changing area frame compositing processing (step S305), which will be described later, the CPU 202 composites X frame(s) selected as the changeless area frame(s) as the changeless area. Through the above processing, a changeless area image with less noise can be generated. This method is effective particularly when dark area noise appears significantly such as when image capturing is performed at night time.

Figure 16:
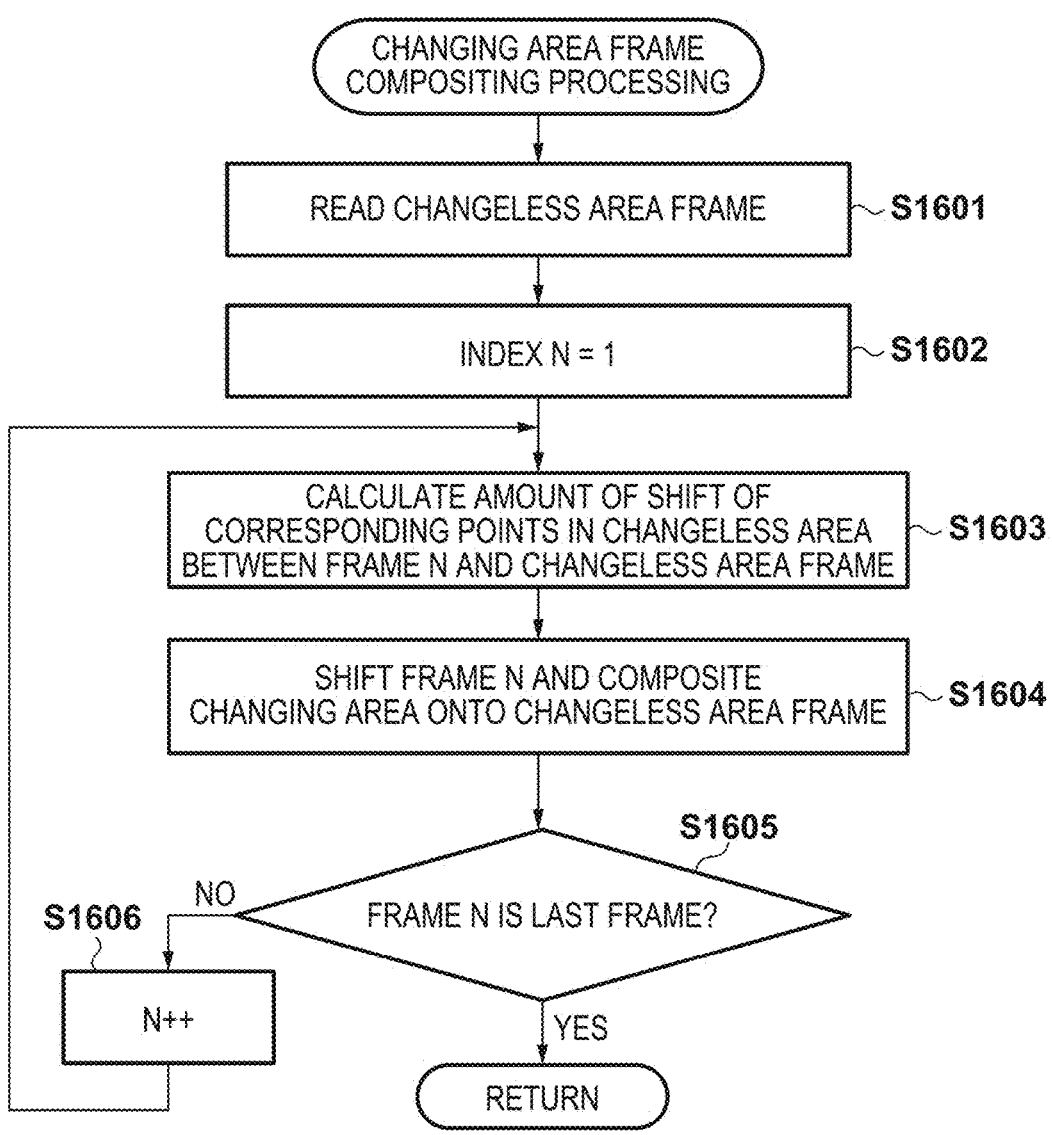
FIG. 16 is a flowchart illustrating details of changing area frame compositing processing (step S305).

FIG. 16 is a flowchart illustrating details of the changing area frame compositing processing (step S305). In step S1601, the CPU 202 reads the changeless area frame selected in step S304 into the working memory area 205. In step S1602, the CPU 202 sets the processing target frame index N to 1.

In step S1603, the CPU 202 performs corresponding point extraction processing of extracting corresponding points between the frame N and the changeless area frame, and calculates the amount of shift when the frame N is composited onto the changeless area frame. In step S1604, the CPU 202 shifts the frame N based on the amount of shift calculated in step S1603 so as to compose the changing area of the frame N onto the changeless area frame. At this time, the CPU 202 identifies the changing area of the frame N by referencing to the changing area/changeless area map (FIG. 14). With respect to the ratio of sum of pixel values during compositing processing, in the present embodiment, a value obtained by division by the number of frames to be composited is used as being suitable for reflected light when image capturing is performed at day time. However, the ratio of sum of pixel values is not limited thereto. For example, if it is determined that image capturing was performed at night time, a value obtained without division by the number of frames may be used as an example suitable for the active object being a luminous object.

In step S1605, the CPU 202 determines whether or not the frame N is the last frame among the processing target frames. If it is determined that the frame N is not the last frame, the CPU 202 increments N by one in step S1606, and thereafter again advances the processing to step S1603. If it is determined that the frame N is the last frame, the CPU 202 ends the processing shown in the flowchart and returns to the flowchart shown in FIG. 3.

In FIG. 16, the area corresponding to the changing area of each of all processing target frames is composited to generate an area corresponding to the changing area of the resulting image, but the present embodiment is not limited thereto. To generalize it, the CPU 202 generates an area corresponding to the changing area of the resulting image by compositing the area corresponding to the changing area of each of Y frames (where Y is an integer greater than X) among the processing target frames. In this case as well, because Y is greater than X (in other words, because the number of compositing target frames for changing area is larger than the number of compositing target frames for changeless area), it is possible to achieve both suppression of image blurring in the changeless area and the slow shutter effect with respect to the changing area.

Figure 17:
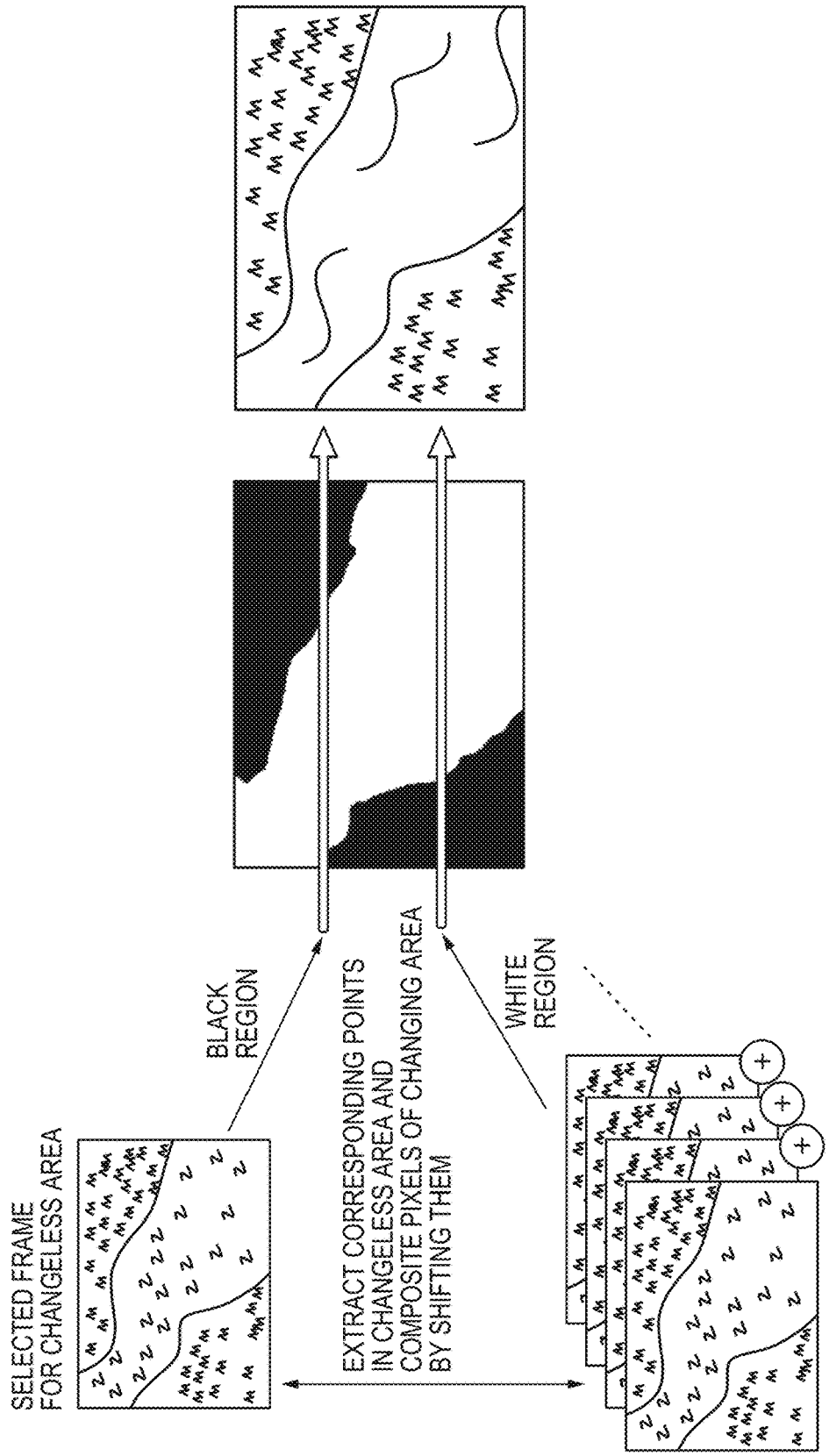
FIG. 17 is a diagram showing an example of a resulting image.

FIG. 17 is a diagram showing an example of a resulting image obtained by the changing area frame compositing processing. As a result of compositing the changing area of each frame onto the changeless area frame in accordance with the changing area/changeless area map, it is possible to generate a resulting image having a smooth motion in the changing area as if slow shutter capture was performed without causing blurring in the changeless area, while maintaining the sense of resolution.

As described above, according to the first embodiment, the smartphone 201 divides the area corresponding to the captured angle of view of the moving image into a changing area and a changeless area. Then, the smartphone 201 composes the area corresponding to the changeless area in each of X frame(s) (where X is an integer of 1 or more) among a plurality of frames and the area corresponding to the changing area in each of Y frames (where Y is an integer greater than X) among the plurality of frames. With this configuration, it is possible to generate an image having a slow shutter effect while reducing image blurring in a changeless area even when image capturing is performed under conditions prone to camera shake.

Second Embodiment

In a second embodiment, a configuration will be described that allows the user to change various types of processing parameters of the slow shutter effect processing by the smartphone 201 receiving an input from the user. In the present embodiment, the basic configuration of the smartphone 201 is the same as that of the first embodiment (see FIG. 2). Hereinafter, differences from the first embodiment will be mainly described.

Figure 18:
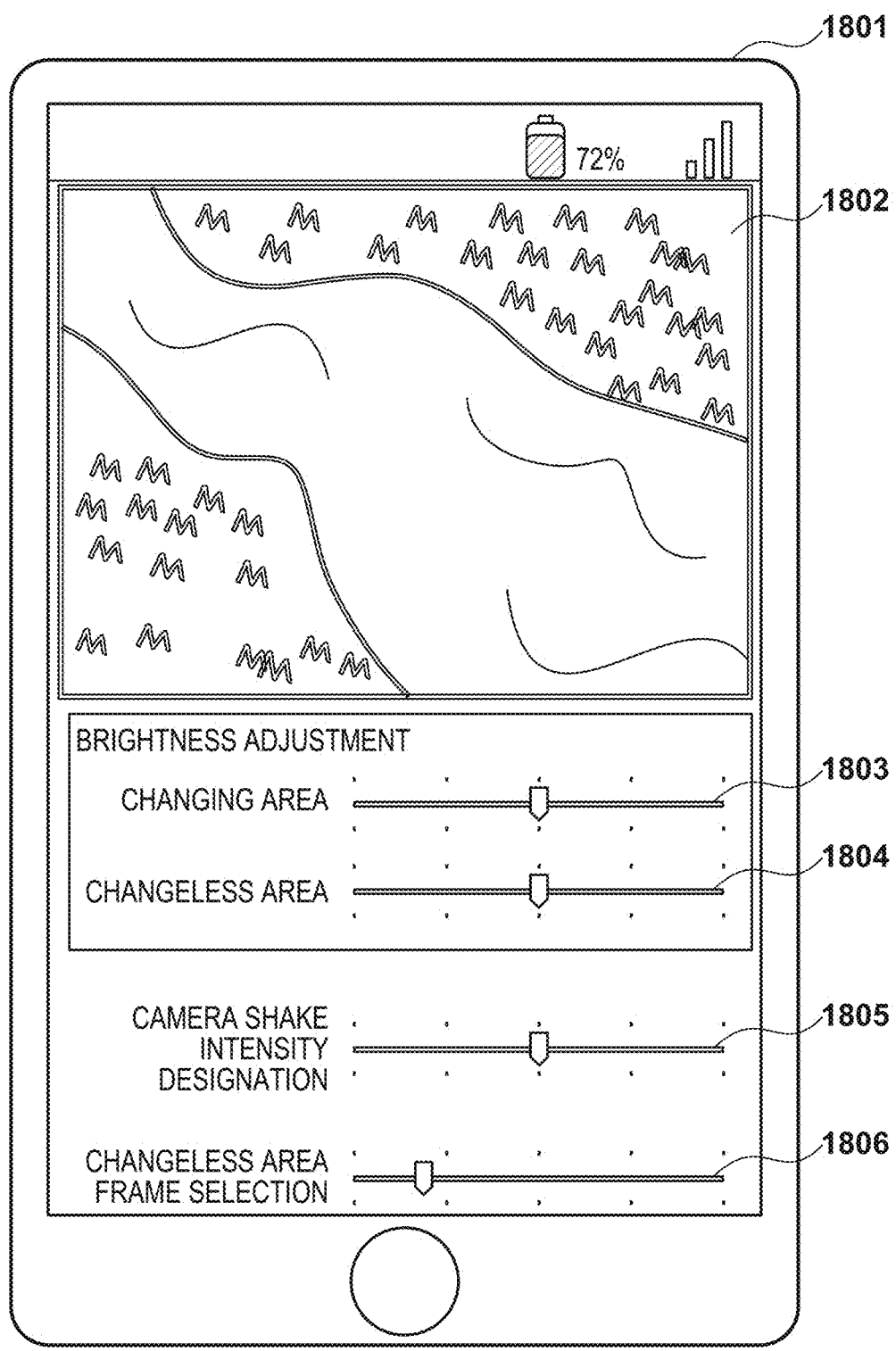
FIG. 18 is an external view of a smartphone 201.

FIG. 18 is an external view of the smartphone 201. In FIG. 18, reference numeral 1801 is a smartphone housing. Reference numeral 1802 indicates a resulting image display area. In the resulting image display area 1802, a resulting image obtained by the slow shutter effect processing is displayed. Reference numeral 1803 is a changing area brightness level adjustment slider, and the user can adjust the brightness of the changing area through operation of the changing area brightness level adjustment slider 1803. Internal processing is performed such that, in step S1604, the overall brightness and the hanged. Reference numeral 1804 is a changeless area brightness level adjustment slider, and the user can adjust the brightness of the changeless area through operation of the changeless area brightness level adjustment slider 1804. The internal processing is performed such that, as with the changing area brightness level adjustment slider 1803, the overall brightness and the compositing ratio used when each frame is composited onto the changeless area frame in step S1604 are changed. Reference numeral 1805 is a camera shake intensity designation slider, and the user can change the threshold value (second threshold value) used in the motion vector thresholding processing in step S802 through operation of the camera shake intensity designation slider 1805. If the area that should be determined as the changeless area is processed as the changing area and the sense of resolution is lost, the user can move the camera shake intensity designation slider 1805 to the right side, and the wrong determination as the changing area is thereby corrected to a correct determination as the changeless area, as a result of which the sense of resolution can be restored. If, on the other hand, the area that should be determined as the changing area is processed as the changeless area, and there is insufficient slow shutter effect in the river current, the user can move the camera shake intensity designation slider 1805 to the left side, and the wrong determination as the changeless area is thereby corrected to a correct determination as the changing area. As a result, an appropriate slow shutter effect can be applied to the river current. Reference numeral 1806 is a changeless area frame selection slider, and the user can, through operation of the changeless area frame selection slider 1806, scan processing target frames and select a desired single frame as the changeless area frame. Particularly when the exposure time for each frame at the time of capturing a moving image is long such as when image capturing is performed at night time, and there is a significant camera shake in the changeless area, the user can, through operation of the changeless area frame selection slider 1806, select a frame with little camera shake.

As described in the first embodiment, the number of changeless area frames may be two or more. In this case, a changeless area frame other than the single frame selected by a user instruction via the changeless area frame selection slider 1806 is selected by using the method described in the first embodiment. Alternatively, the changeless area frame selection slider 1806 may be configured so as to allow the user to select a plurality of changeless area frames.

As described above, according to the second embodiment, if various types of processing parameters of the slow shutter effect processing do not fit to the user's preference, the user can change the parameters. It is thereby possible to generate an image with a slow shutter effect that meets the user's preference.

Third Embodiment

In a third embodiment, an example will be described in which the slow shutter effect processing is applied to capturing while panning. In the present embodiment, the basic configuration of the smartphone 201 is the same as that of the first embodiment (see FIG. 2). Hereinafter, differences from the first embodiment will be mainly described.

In the changing area/changeless area dividing processing performed in step S303, the area corresponding to the captured angle of view of the digital camera 101 is relatively divided into a changing area and a changeless area. Accordingly, in the case where panning is performed, an active object is determined as the changeless area, and a moving (sliding) background is determined as the changing area. By compositing frames corresponding to a long period of seconds onto the background, it is possible to achieve an effect of having a smoothly moving background. Note that, in the present embodiment, in the camera shake frame excluding processing in step S402, the CPU 202 does not exclude frames in which a significant change occurred in the camera attitude. To be more specific, by not performing the processing in step S602, it is possible to achieve the slow shutter effect in an image obtained by, for example, capturing such as panning. In the present embodiment, the CPU 202 determines, based on the camera attitude information recorded as metadata in the moving image file 210, whether or not the moving image is a moving image captured by panning. For example, if the camera attitude is changed at the same angular velocity, the CPU 202 can determine that the moving image is a moving image captured by panning. If it is determined that the moving image is a moving image captured by panning, the CPU 202 does not perform the processing in step S602, and otherwise, the CPU 202 performs the processing in step S602.

As described above, according to the third embodiment, an image with a slow shutter effect of having a smoothly moving background can be generated from moving image data obtained by capturing while panning as well.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-025203, filed Feb. 12, 2016, which is hereby incorporated by reference herein in its entirety.

What is claimed is:

1. An image processing apparatus comprising:
a dividing unit configured to divide a frame of a moving image into a changing area in which there is an active object and a changeless area in which there is a stationary object; and
a generation unit configured to generate a still image by compositing an area corresponding to the changeless area in each of X frame(s) (where X is an integer of 1 or more) among a plurality of frames included in the moving image and an area corresponding to the changing area in each of Y frames (where Y is an integer greater than X) among the plurality of frames,
wherein the dividing unit includes:
a detection unit configured to detect motion vectors in each of a plurality of areas in each of the plurality of frames;
an identifying unit configured to identify, from among the detected motion vectors, camera shake motion vectors caused by a camera shake at a time of capturing the moving image;
a summation unit configured to, for each area, sum magnitude components of object motion vectors obtained by excluding the camera shake motion vectors from the detected motion vectors; and
a determining unit configured to determine an area in which a sum value obtained by the summation is greater than or equal to a first threshold value as the changing area, and determine an area in which the sum value is less than the first threshold value as the changeless area,
wherein the identifying unit is configured to decide a second threshold value based on a frequency distribution of magnitude components of the detected motion vectors, and identify, from among the detected motion vectors, motion vectors whose magnitude component is less than the second threshold value as the camera shake motion vectors.

2. The image processing apparatus according to claim 1, wherein the identifying unit is configured to decide the second threshold value in accordance with a user instruction, and identify, from among the detected motion vectors, motion vectors whose magnitude component is less than the second threshold value as the camera shake motion vectors.

3. The image processing apparatus according to claim 1, wherein the identifying unit is configured to:
classify the detected motion vectors into a plurality of groups according to direction;
identify a group having a highest degree of concentration of small motion vectors based on the frequency distribution of magnitude components of the detected motion vectors with respect to each of the plurality of groups; and
identify the camera shake motion vectors from the identified group.

4. The image processing apparatus according to claim 1, further comprising:
a selecting unit configured to select the X frame(s), the selecting unit being configured to select, from among the plurality of frames, at least one frame having a smallest object motion in an area corresponding to the changeless area.

5. The image processing apparatus according to claim 4, wherein the selecting unit is configured to select, from among the plurality of frames, a frame having a smallest sum value of magnitude components of motion vectors in each of a plurality of areas corresponding to the changeless area, as the one frame.

6. The image processing apparatus according to claim 4, wherein if X is 2 or more, the selecting unit is configured to further select, from among the plurality of frames, (X−1) frame having a smallest difference with respect to the one frame.

7. The image processing apparatus according to claim 1, further comprising:
a selecting unit configured to select the X frame(s), the selecting unit being configured to select at least one frame in accordance with a user instruction.

8. The image processing apparatus according to claim 1, further comprising:
a singling out unit configured to single out some of all frames included in the moving image as the plurality of frames.

9. The image processing apparatus according to claim 8, wherein the singling out unit is configured to single out, from among the all frames, frames other than frames corresponding to an initial or last predetermined period in a capturing period of the moving image, as the plurality of frames.

10. The image processing apparatus according to claim 9, wherein the singling out unit is configured to decide a length of the predetermined period in accordance with a user instruction.

11. The image processing apparatus according to claim 8, wherein the singling out unit is configured to:
detect, from among the all frames, camera shake frames in which a camera shake occurred at a time of capturing; and
single out, from among the all frames, frames other than the camera shake frames, as the plurality of frames.

12. The image processing apparatus according to claim 11,
wherein the moving image is associated with attitude information indicating an attitude of an image capturing apparatus that has captured the moving image during a capturing period of the moving image, and
the singling out unit is configured to detect, from among the all frames, frames captured at a timing at which an amount of change in the attitude is greater than or equal to a third threshold value as the camera shake frames, based on the attitude information.

13. The image processing apparatus according to claim 12,
wherein the singling out unit is configured to:
determine, based on the attitude information, whether or not the moving image is a moving image captured by panning; and
if it is determined that the moving image is not a moving image captured by panning, detect from among the all frames, frames captured at the timing at which the amount of change in the attitude is greater than or equal to the third threshold value as the camera shake frames, based on the attitude information.

14. An image capturing apparatus comprising:
a dividing unit configured to divide a frame of a moving image into a changing area in which there is an active object and a changeless area in which there is a stationary object;
a generation unit configured to generate a still image by compositing an area corresponding to the changeless area in each of X frame(s) (where X is an integer of 1 or more) among a plurality of frames included in the moving image and an area corresponding to the changing area in each of Y frames (where Y is an integer greater than X) among the plurality of frames; and
an image capturing unit configured to capture the moving image,
wherein the dividing unit includes:
a detection unit configured to detect motion vectors in each of a plurality of areas in each of the plurality of frames;
an identifying unit configured to identify, from among the detected motion vectors, camera shake motion vectors caused by a camera shake at a time of capturing the moving image;
a summation unit configured to, for each area, sum magnitude components of object motion vectors obtained by excluding the camera shake motion vectors from the detected motion vectors; and
a determining unit configured to determine an area in which a sum value obtained by the summation is greater than or equal to a first threshold value as the changing area, and determine an area in which the sum value is less than the first threshold value as the changeless area,
wherein the identifying unit is configured to decide a second threshold value based on a frequency distribution of magnitude components of the detected motion vectors, and identify, from among the detected motion vectors, motion vectors whose magnitude component is less than the second threshold value as the camera shake motion vectors.

15. An image processing method executed by an image processing apparatus, comprising:
dividing a frame of a moving image into a changing area in which there is an active object and a changeless area in which there is a stationary object;
generating a still image by compositing an area corresponding to the changeless area in each of X frame(s) (where X is an integer of 1 or more) among a plurality of frames included in the moving image and an area corresponding to the changing area in each of Y frames (where Y is an integer greater than X) among the plurality of frames;
detecting motion vectors in each of a plurality of areas in each of the plurality of frames;
identifying, from among the detected motion vectors, camera shake motion vectors caused by a camera shake at a time of capturing the moving image;
summing, for each area, magnitude components of object motion vectors obtained by excluding the camera shake motion vectors from the detected motion vectors; and
determining an area in which a sum value obtained by the summation is greater than or equal to a first threshold value as the changing area, and determine an area in which the sum value is less than the first threshold value as the changeless area,
wherein the identifying further includes deciding a second threshold value based on a frequency distribution of magnitude components of the detected motion vectors, and identifying, from among the detected motion vectors, motion vectors whose magnitude component is less than the second threshold value as the camera shake motion vectors.

16. A non-transitory computer-readable storage medium which stores a program for causing a computer to execute an image processing method comprising:
dividing a frame of a moving image into a changing area in which there is an active object and a changeless area in which there is a stationary object;

generating a still image by compositing an area corresponding to the changeless area in each of X frame(s) (where X is an integer of 1 or more) among a plurality of frames included in the moving image and an area corresponding to the changing area in each of Y frames (where Y is an integer greater than X) among the plurality of frames;

detecting motion vectors in each of a plurality of areas in each of the plurality of frames;

identifying, from among the detected motion vectors, camera shake motion vectors caused by a camera shake at a time of capturing the moving image;

summing, for each area, magnitude components of object motion vectors obtained by excluding the camera shake motion vectors from the detected motion vectors; and determining an area in which a sum value obtained by the summation is greater than or equal to a first threshold value as the changing area, and determine an area in which the sum value is less than the first threshold value as the changeless area, wherein the identifying further includes deciding a second threshold value based on a frequency distribution of magnitude components of the detected motion vectors, and identifying, from among the detected motion vectors, motion vectors whose magnitude component is less than the second threshold value as the camera shake motion vectors.

* * * * *